2,818,442

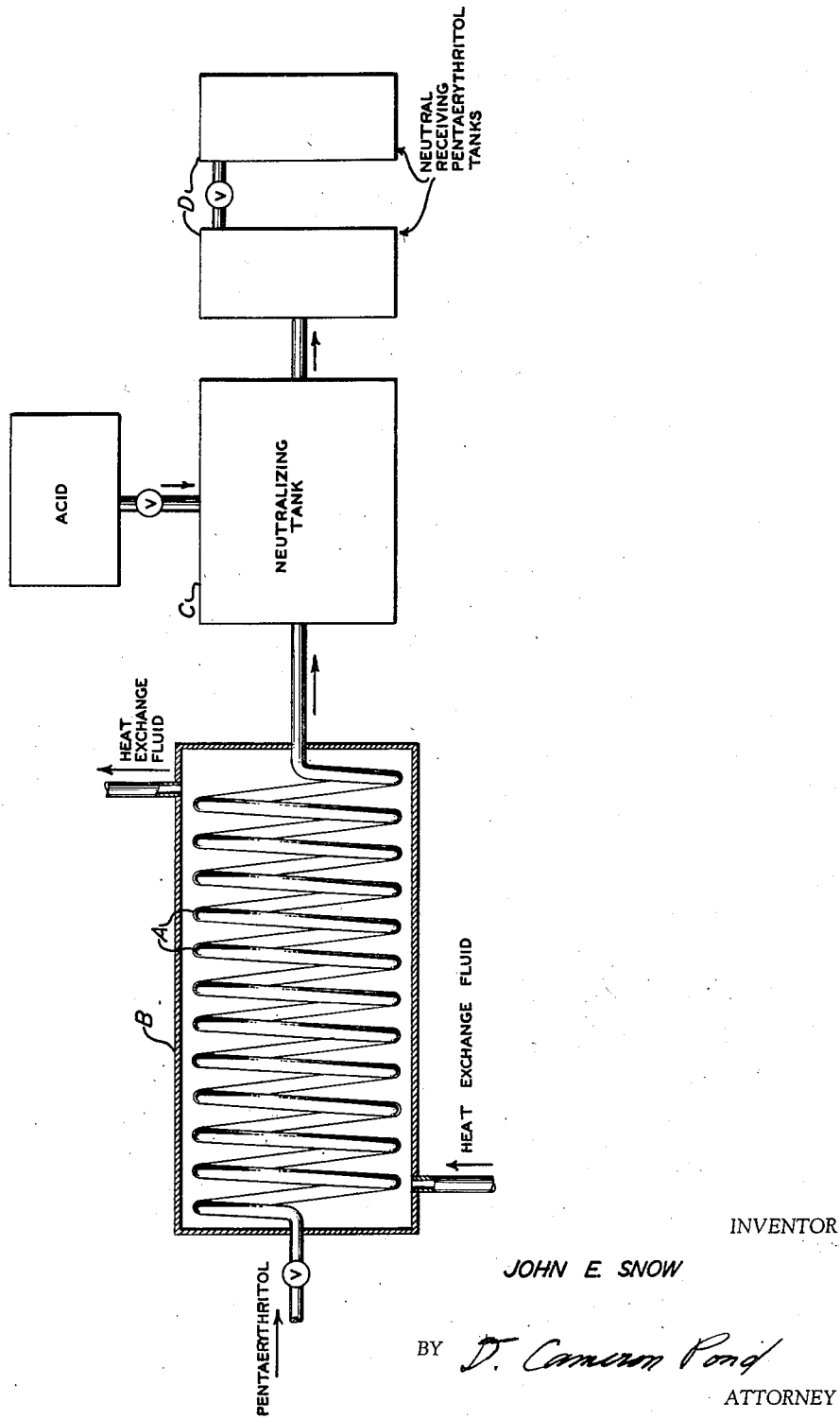

PREPARATION OF PENTAERYTHRITOL AND THERMAL REDUCTION OF FORMALDEHYDE CONTENT

John E. Snow, Hasbrouck Heights, N. J., assignor to Heyden Newport Chemical Corporation, a corporation of Delaware Application November 23, 1953, Serial No. 393,543

3 Claims. (Cl. 260—635)

This invention relates to an improved method for the preparation of pentaerythritol by reaction of acetaldehyde with formaldehyde using a strong alkaline catalyst such as a hydroxide or carbonate of an alkali metal. More particularly, this invention provides an improved method for rapidly reducing excess formaldehyde to a minimum to obtain maximum recovery of relatively pure pentaerythritol either batch-wise or continuously.

The reactions for preparing pentaerythritol may be illustrated by the following equations:

(1) 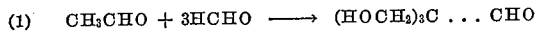

(2) 

Equation 1 illustrates the first stage and is an aldol condensation of formaldehyde with acetaldehyde to obtain trimethylol acetaldehyde wherein the alkali acts as a catalyst. Equation 2 is a quantitative Cannizarro reaction wherein the substituted acetaldehyde is converted to pentaerythritol with quantitative formation of an equivalent of alkali metal formate. In practice an excess of formaldehyde is necessary to obtain maximum yields of pentaerythritol. It becomes necessary, however, to remove the free excess formaldehyde in order to isolate the maximum recovery of pentaerythritol from the reaction mixture.

As has been suggested and commonly practiced in the art, the reaction mixture, after completion of the reaction step, is slowly digested for several hours at a temperature of 50°–70° C. in the presence of alkali, i. e. sodium hydroxide, to reduce the excess formaldehyde content by means of the Cannizarro reaction and allow the pentaerythritol to crystallize in good yield. It has also been suggested to add bisulfite and other compounds that readily react with formaldehyde to lower the free formaldehyde content of the pentaerythritol reaction liquors to a suitably low level. All of these methods are impractical not only because of the excessive cost of chemicals, but also due to the fact that the long time involved in these methods of reduction of the formaldehyde content make the continuous preparation of pentaerythritol impractical.

According to the present invention the reduction of the free formaldehyde content of the pentaerythritol reaction liquors and their subsequent neutralization is effected so rapidly that the procedure hereof is useful in conjunction with continuous pentaerythritol production methods and even for batch-wise methods the efficiency is greatly enhanced. Thus the present method most desirably is a part of continuous pentaerythritol production methods or can increase the efficiency of batch-wise methods, as desired. The treatment of pentaerythritol reaction liquors either continuously or batch-wise according to the present invention does not in any wise affect the normally high yields available from known procedures, but substantially reduces the time for effecting the removal of free formaldehyde as well as reducing the excessive quantities of sodium hydroxide or other strong alkali normally used to remove the excess formaldehyde.

According to the present method the pentaerythritol reaction liquor containing substantial quantities of both formaldehyde and alkali are rapidly subjected to a relatively high temperature digestion by heating the same in the range of 85°–100° C., preferably 95°–98° C., for a short period of time ranging from one to fifteen minutes, preferably one and five-tenths to nine minutes, whereby both the free formaldehyde and alkali are substantially reduced by interaction, and then finally neutralizing to a substantially neutral or acid pH of between 6 to 7, preferably about 6.2 to 6.6. Thereafter, the neutral pentaerythritol liquor substantially free of formaldehyde is treated to recover the pentaerythritol by the usual well-known methods such as further concentration and crystallization.

Following the procedure hereof, crude pentaerythritol liquors containing 1 to 3% (usually about 2%) of free formaldehyde, and about ½ to 1½% (usually about 1%) of strong alkali has the free formaldehyde content reduced about 3 to 15 fold to about a .2 to .4% formaldehyde content with a corresponding decrease in free alkali by heating the same to the temperature range of 85°–100° C. in a total heating time of about one to fifteen minutes, usually less than ten minutes, to effect the desired formaldehyde reduction. In practice the pentaerythritol reaction liquor may be passed continuously through a heat exchanger adjusted in size and through-put so that the liquor is merely heated to the desired temperature for a few minutes in the temperature range given.

Suitable apparatus for effecting this treatment may consist of an ordinary coil of pipe suspended in a tank through which heat exchange fluid such as hot water or steam is passed in a manner to flow over the outside of the coil and heat the pentaerythritol liquor passing therethrough. The pentaerythritol liquor is passed at a controlled rate through the coils. The reaction is substantially finished in the time taken for the liquor to pass through the pipe heated to the given temperature range.

The drawing shows diagrammatically a coil of pipe A such as copper pipe suspended in a tank B into which steam or hot water is passed, the assembly comprising a heat exchanger. The pentaerythritol liquor containing free formaldehyde is continuously passed through the pipe A and is next led to a tank C into which is simultaneously and continuously further introduced sufficient acid, such as sulfuric acid, to neutralize and slightly acidify the minor quantities of residual strong alkali. The neutralized liquor in the pH range of 6 to 7.0 is then passed into drums D from which the pentaerythritol is finally recovered by conventional methods such as evaporation and crystallization. The following examples show the practice of this invention:

Example 1

A pentaerythritol reaction liquor having a free formaldehyde content of 2.04% and containing 0.723% of sodium hydroxide, the molecular ratio of formaldehyde to the sodium hydroxide being 3.68:1, was passed through a 300 foot ⅜ inch copper coil heat exchanger system illustrated in the drawing and heated by hot water at a temperature of 95°–100° C. The liquor was run through the heat exchanger at the rate of 0.6 linear foot per second, a total of 6.35 gallons per hour, and was discharged at a temperature of 96°–98° C. At the discharge end of the coil the liquor was found to contain 0.31% of free formaldehyde and 0.018% of free caustic soda representing a reduction of formaldehyde to about ⅐ its original content by heating with a total heat exposure of about eight minutes. It was continuously passed into a neutralizer tank and continuously neutralized by continuous addition of sulfuric acid to a pH of 6.5. A sample of this neutralized liquor was treated to recover the pentaerythritol by evaporation and crystallization. The yield was the same as normally obtained by usual and more lengthy methods for "knock-down" of free formaldehyde and neutralization such as heating for several hours at 50°–70° C. As illustrated here, no additional caustic soda was supplied to effect the removal of formaldehyde, however, the excess formaldehyde was removed in a comparatively short time by this continuous treatment without loss or reduction in yield or quality of the pentaerythritol recovered.

*Example 2*

A pentaerythritol reaction liquor containing 1.95% of free formaldehyde and 0.680% of sodium hydroxide, a molecular ratio of 2.34:1, was run through the same apparatus as in Example 1 at a rate of 1.7 linear feet per second and the pentaerythritol reaction liquor passed out of the heat exchanger at a temperature of 95°–96° C., a total heating time of about 2.8 minutes. It was found to contain .34% of free formaldehyde, a reduction to about ⅙ its original free formaldehyde content. This liquor was then continuously neutralized to a pH of 6.5 with sulfuric acid and the pentaerythritol was then recovered in the usual manner with a normal yield and quality of product.

*Example 3*

A pentaerythritol reaction liquor containing 1.77% of free formaldehyde and 1.17% of sodium hydroxide, a molecular ratio of 2.02:1, was passed through the heat exchanger as in Example 1 at a rate of 2.91 linear feet per second and passed out of the heat exchanger at a temperature of 97°–98° C., a total heating time of about 1.6 minutes. It was found to contain 0.34% of free formaldehyde, a reduction of about ⅕ of its original free formaldehyde content. The reaction liquor was then continuously neutralized to a pH of 6.4 with sulfuric acid and a normal yield of pentaerythritol was obtained from the neutralized product.

*Example 4*

A pentaerythritol liquor containing 1.76% of free formaldehyde and 1% of sodium hydroxide, a molecular ratio of 2.36:1, was passed through a heat exchanger as in Example 1 at a rate of 2.71 feet per second leaving the exchanger at a temperature of 94°–95° C., a total heating time of about 1.8 minutes. The resulting solution had a free formaldehyde content of 0.25%, a reduction to about ⅐ of its original free formaldehyde content. It was then neutralized to a pH of about 6.5 and the pentaerythritol was recovered in normal yield and quality.

*Example 5*

A pentaerythritol reaction liquor containing 2.03% of free formaldehyde and 0.99% of sodium hydroxide, a molecular ratio of 2.73:1, was passed through a heat exchanger as in Example 1 at a rate of 1.32 linear feet per second and discharged from the heat exchanger at 92°–94° C., a total heating time of about 3.7 minutes. The free formaldehyde content of the liquor was found to be reduced to 0.23%, a reduction to about ⅛ of its original formaldehyde content. It was neutralized to a pH of 6.5 and the pentaerythritol was recovered therefrom in normal yield and quality.

*Example 6*

A pentaerythritol reaction liquor containing 1.94% of free formaldehyde and 0.90% of sodium hydroxide, a molecular ratio of 2.88:1, was passed through the heat exchanger as in Example 1 at a rate of 1.10 linear feet per second and discharged from the heat exchanger at a temperature of 97°–98° C., a total heating time of about 4.5 minutes. The free formaldehyde content was found to be reduced to 0.32%, a reduction to about ⅙ of its original free formaldehyde content. It was neutralized to a pH of 6.5 and worked up to recover the pentaerythritol which was comparable in yield and quality to that usually available from normal procedures.

*Example 7*

A pentaerythritol reaction liquor containing 1.60% of free formaldehyde and 0.70% of sodium hydroxide, a molecular ratio of 3.06:1, was passed through the heat exchanger as in Example 1 at a rate of 1.37 linear feet per second and discharged from the heat exchanger at a temperature of 97°–98° C., a total heating time of about 3.6 minutes. It was found to have its formaldehyde content reduced to 0.32%, a reduction to about ⅕ its original free formaldehyde content. It was neutralized to a pH of 6.5 and then worked up to recover the pentaerythritol in normal yield and quality.

As illustrated by these several examples, normal pentaerythritol liquor wherein strong alkali, i. e. a hydroxide or carbonate of an alkali metal such as sodium potassium or lithium, has been used to form the pentaerythritol in the presence of an excess of formaldehyde to obtain maximum yields, will have its free formaldehyde as well as alkali rapidly reduced by simply passing the liquid through a heat exchanger wherein the temperature of the reaction liquor is raised to the range of 85°–100° C., with a total heating time of only a few minutes. The thruput of the 300 foot heat exchange coil in these examples allowed a time variation of about 1.5 to 10 minutes all with high reductions of free formaldehyde. Some portion of this time was expended in warming the liquor to the critical temperature range.

This procedure is in sharp contrast to methods known in the art in that it is far more rapid and thereby lends itself to continuous treatment of pentaerythritol liquors. Therefore, it can be a useful adjunct to continuous or batch-wise processing of pentaerythritol liquors by rapidly reducing the formaldehyde content of the liquor and simultaneously lowering the alkali to a minimum which may more economically be continuously neutralized. The method saves both in time and chemicals normally used to remove the free formaldehyde from pentaerythritol reaction liquors. The method does not affect the normal yield or quality of the product available by usual more time-consuming and expensive procedures.

I claim:

1. In the synthesis of pentaerythritol by reaction of acetaldehyde with an excess of formaldehyde in an aqueous medium and in the presence of an alkali metal hydroxide to form an aqueous reaction liquor, the steps of reducing the free formaldehyde content of the reaction liquor by passing the liquor containing free formaldehyde and alkali metal hydroxide through a heat exchanger maintained at a temperature of 85–100° C. at a rate sufficiently rapid to raise the temperature of the reaction liquor to this range and heat the liquor for a period of about 1 to 15 minutes, and then neutralizing the hot reaction liquor to a pH in the range of 6 to 7.

2. In the synthesis of pentaerythritol by reaction of acetaldehyde with an excess of formaldehyde in an aqueous medium and in the presence of an alkali metal hydroxide to form an aqueous reaction liquor, the steps of reducing the free formaldehyde content of the reaction liquor by passing the liquor containing free formaldehyde and alkali metal hydroxide through a heat exchanger maintained at a temperature of 85–100° C. at a rate sufficiently rapid to raise the temperature of the reaction liquor to this range and heat the liquor for a period of about 1 to 15 minutes, and continuously neutralizing the free alkali metal hydroxide in the hot liquor upon discharge from the heat exchanger with acid to a pH in the range of 6 to 7.

3. The method of rapidly producing pentaerythritol comprising reacting acetaldehyde with an excess of formaldehyde in an aqueous medium and in the presence of free alkali metal hydroxide to form an aqueous reaction liquor containing free formaldehyde and alkali metal hydroxide, heating the reaction liquor for about 1 to 15 minutes at a temperature within the range of 85–100° C., neutralizing the hot reaction liquor to a pH of 6 to 7, and thereafter recovering pentaerythritol from the neutralized reaction liquor.

References Cited in the file of this patent

UNITED STATES PATENTS

| | | |
|---|---|---|
| 1,878,040 | Voss | Sept. 20, 1932 |
| 2,372,602 | Owens | Mar. 27, 1945 |
| 2,407,920 | Cox | Sept. 17, 1946 |
| 2,612,525 | Robeson et al. | Sept. 30, 1952 |
| 2,696,507 | Cake | Dec. 7, 1954 |
| 2,714,616 | Schnizer et al. | Aug. 2, 1955 |

FOREIGN PATENTS

| | | |
|---|---|---|
| 390,622 | Germany | Feb. 22, 1924 |

OTHER REFERENCES

Pajunen Chem. Abstracts 42, 8155 (1948).